United States Patent [19]
Bartsch et al.

[11] Patent Number: 5,343,988
[45] Date of Patent: Sep. 6, 1994

[54] SUITCASE OR SIMILAR CONTAINER WITH WHEEL BRAKE

[75] Inventors: Georg Bartsch; Ulf Rasch, both of Iserlohn; Michael Spiekermann, Menden, all of Fed. Rep. of Germany

[73] Assignee: Sudhaus Schloss - Und Beschlagtechnik Gmbh & Co., Iserlohn, Fed. Rep. of Germany

[21] Appl. No.: 768,662

[22] PCT Filed: Jan. 26, 1991

[86] PCT No.: PCT/EP91/00152

§ 371 Date: Oct. 15, 1991

§ 102(e) Date: Oct. 15, 1991

[87] PCT Pub. No.: WO91/11127

PCT Pub. Date: Aug. 8, 1991

[30] Foreign Application Priority Data

Jan. 26, 1990 [DE] Fed. Rep. of Germany ... 9000882[U]

[51] Int. Cl.⁵ .......... A45C 5/14; A45C 13/22; B62B 5/04; B62B 33/02
[52] U.S. Cl. .......... 190/18 A; 190/115; 280/37; 280/47.26; 188/5
[58] Field of Search .......... 190/10 A, 115; 188/69, 188/5; 280/37, 47.26

[56] References Cited

U.S. PATENT DOCUMENTS

| | | | |
|---|---|---|---|
| 1,043,038 | 10/1912 | Alexander | 190/18 A X |
| 1,081,670 | 12/1913 | James | 190/18 A X |
| 1,092,506 | 4/1914 | Oldroyd | 190/18 A X |
| 1,197,190 | 9/1916 | Dunn et al. | 190/18 A X |
| 2,879,865 | 3/1959 | Simmons | 188/69 |
| 2,917,317 | 12/1959 | Denholm | 190/18 A X |
| 2,988,175 | 6/1961 | West | 188/69 X |
| 3,376,954 | 4/1968 | Neptune | 188/69 |
| 3,690,415 | 9/1972 | Nordskog et al. | 188/69 |
| 4,575,109 | 3/1986 | Cowdery | 190/18 A X |
| 4,915,402 | 4/1990 | Brinker | 190/18 A X |
| 5,147,019 | 9/1992 | Van Hooreweder et al. | 190/115 X |

FOREIGN PATENT DOCUMENTS

| | | |
|---|---|---|
| 2510720 | 9/1976 | Fed. Rep. of Germany. |
| 2736941 | 3/1979 | Fed. Rep. of Germany ... 190/18 A |
| 961977 | 11/1949 | France ... 190/18 A |
| 8001671 | 8/1980 | PCT Int'l Appl. ... 190/18 A |
| 693373 | 7/1953 | United Kingdom ... 190/18 A |
| 2168035 | 6/1986 | United Kingdom ... 190/18 A |

*Primary Examiner*—Sue A. Weaver
*Attorney, Agent, or Firm*—Herbert Dubno; Yuri Kateshov

[57] ABSTRACT

A wheeled suitcase has a handle connected via a cabling mechanism to a brake or lock for at least one wheel. A first spring mechanism acts upon the brake or lock in a locking direction with a lesser force than that of a second spring mechanism acting upon the cabling mechanism in the opposite direction. Engagement of the handle by the user releases the brake. The relaxation of the second spring mechanism allows the first spring mechanism to reengage the brake when the handle is released.

21 Claims, 7 Drawing Sheets

SUITCASE OR SIMILAR CONTAINER WITH WHEEL BRAKE

CROSS REFERENCE TO RELATED APPLICATIONS

This application is a national phase of PCT/EP91/00152 filed Jan. 26, 1991 and based, in turn, upon German national application G 90 00 882.0 filed Jan 26, 1990 under the International Convention.

FIELD OF THE INVENTION

The invention relates to a suitcase or a similar container according to the introductory part of claim 1.

BACKGROUND OF THE INVENTION

Suitcases or similar containers are known which have more than two wheels, rollers or the like, by means of which they can be drawn over a support surface with only little effort. Traditionally, such suitcases or containers are provided with a guide handle, so that they can be easily handled while moving and also afford a comfortable point of application for the hand of the user.

In such suitcases or similar containers, the wheels are supported freely movable on the corresponding bottom side of the suitcase. Therefore, these suitcases can start rolling by themselves in an undesired manner, whenever they are deposited on an inclined surface, e.g. an inclined conveyor belt. During such motion, the suitcase can reach speeds which at an impact or the like can result in damage to the suitcase itself, its contents, or to other pieces of luggage or equipment; under particularly unfavorable circumstances such impact can lead to personal injury.

OBJECT OF THE INVENTION

It is the object of the invention to provide a suitcase or a similar container which eliminates the danger of the above-described damages or injuries.

SUMMARY OF THE INVENTION

According to the invention, this object is attained by providing blocking means which are capable of blocking at least one roller, wheel or the like of the suitcase or container. Due to the blocking means proposed by the invention, which act like a quasibraking device, unintended motions of the suitcase or similar container can be reliably prevented.

The blocking of the wheels of the suitcase or similar container can be achieved safely and inexpensively when the blocking means has a pin which can engage at least one roller, wheel or the like for the purpose of blocking it. The roller, wheel or the like can have a recess formed thereon, the pin being slidable into this recess.

Advantageously, the blocking of the wheels is combined with the actuation of the handle mechanism used for guiding the suitcase, so that the suitcase is released only when the handle is set by the user into its operational position. As long as the handle mechanism is in its rest position, the wheels are reliably blocked. In this embodiment, any additional handling for the actuation of the blocking means is eliminated. This is achieved by connecting the handle via a coupling device with the blocking means so that in the rest position of the handle the blocking means blocks at least one roller, wheel or the like and in the operational position of the handle releases the roller, wheel or the like.

The coupling device can have a slider and an element, whereby during resetting of the handle from its rest into its operational position, the slider via the element resets the blocking means for the release of the roller, wheel or the like.

The connection between the handle mechanism and the blocking means is thus achieved in a manner which is particularly simple from the point of view of construction and particularly reliable from the point of view of functional safety.

Advantageously a first spring mechanism acts upon the blocking means so that the blocking means is prestressed in the direction in which it blocks the roller, wheel or the like. A second spring mechanism acts upon the slider prestressing it in the direction wherein it pulls the blocking means via the aforementioned element to release the roller, wheel or the like. The second spring mechanism is designed to be stronger than the first spring mechanism so that the blocking means in the operational position of the handle is always set into a position wherein it releases the roller, wheel or the like.

By means of this spring arrangement, a reliable operation of the blocking means can be insured in a mechanically simple manner even after prolonged use of the suitcase. The adjustments within the blocking means required for the blocking action are performed to some degree without any external intervention, exclusively through internal adjustment processes.

Between the slider and the handle a rod can be arranged at whose one end the handle is hinged and whose other end can be made to rest against the slider, whereby the rod is vertically adjustable on the suitcase between an extended position wherein the handle assumes its operational position and a retracted position wherein the handle assumes its rest position. The other end of the rod in its retracted position presses the slider into a position wherein the blocking means can be brought to engage with the roller, wheel or the like.

This construction of the handle mechanism achieves a rigid connection between the handling and the suitcase enabling the suitcase to run simply and safely during changes of direction without the danger of tipping over; furthermore, a reliable actuation of the blocking means through the handle mechanism can be insured with little constructive effort.

The rod can be blocked in its retracted position by means of a catch which can be set through the handle in a blocking or release position.

Thus the handle mechanism can be kept reliably in its rest position, which at the same time achieves a blocking of the wheels, as long as there is no intention to run the suitcase.

The catch can be reset from its blocking position into its release position by means of a shoulder formed in one piece with the handle.

As a result, it is possible to achieve a blocking and release of the handle mechanism and thereby of the blocking means without any additional manipulation.

According to a feature of the invention, between the slider and the handle a belt strap is provided which can be pulled out of the suitcase. In the last segment of the path of this strap from the retracted position, wherein the handle is in its rest position, to its extended position, wherein the handle assumes its operational position, the strap entrains the slider optionally against the force of the second spring mechanism so that in the operational position of the handle the blocking means is set into a position which releases the roller, wheel or the like. A first blockable roller, wheel or the like is arranged close to the frontal end of the suitcase or similar container—considered in the running direction—and a second blockable roller, wheel or the like is arranged close to the rear end of the suitcase or similar container.

This arrangement provides the advantages of the blocking means of the invention also in connection with rollaway suitcases whose handle mechanism is provided with a belt strap as a holder.

The operational safety of the rollaway suitcase can even be further improved by providing several wheels with the blocking means of the invention.

This applies particularly when the wheels equipped with the blocking means are close to the rear as well as to the front edge of the suitcase, since then a sliding motion of the suitcase which does not originate from rolling axes equipped with at least one blocking device can be efficiently prevented.

The first spring mechanism can be arranged between a U-shaped bearing block mounted in a downwardly open housing, the bearing block rotatably supporting the wheel between the free ends of its legs, and a locking part, and prestresses the locking part in a position which blocks the wheel.

This allows a protected manner of mounting the wheel to the suitcase on the one hand, and on the other hand a technically simple arrangement of the first spring mechanism, as well as of the locking component blocking the wheel.

The locking part can be supported so as to be vertically slidable by means of projections formed at its front sides and engaging in the slots provided in the legs of the bearing block.

As a result of the fact that the locking part is slidably attached to the bearing block, it is possible to reliably avoid tilting, etc of the locking part which could incapacitate the blocking means.

The locking part can be brought to engage recesses formed in at least one lateral flange of the wheel.

This provides a reliable engagement between locking part and wheel so that the engagement between locking part and wheel can be established and released in a simple manner.

It is also possible to make the wheel steerable.

The first spring mechanism can be arranged between a downwardly open housing mounted on the suitcase and a bearing block rotatably supported in the housing which rotatably supports the wheel between the free ends of its legs, so that it prestresses the bearing block and thereby also the wheel in a position wherein the direction of rotation of the wheel is perpendicular to the running direction.

Thus it can be insured that each time when the suitcase moves or is lifted without being guided, the wheel is set in a position wherein its direction of rotation is not parallel to the running direction, which prevents an unintended move of the suitcase.

An arresting edge can be formed on the bearing block which abuts against an arresting edge formed on the housing when the direction of rotation of the wheel is perpendicular to the running direction.

As a result, as long as no guided movement of the suitcase takes place, the wheel is fixed in a position wherein its direction of rotation is perpendicular to the running direction.

On the housing an angle lever is swingably mounted and is prestressed by means of a spring in a position wherein it can engage in a recess formed on the bearing block and can block the bearing block in a position wherein the direction of rotation of the wheel is perpendicular to the running direction, whereby the angle lever can be swung by means of an element mounted on the lever to disengage the recess.

Hence the bearing block and thereby the wheel can be blocked in the position which is perpendicular with respect to the running direction, when the handle or the handlebar, is in its rest position.

The first spring mechanism can be arranged between a downwardly open housing mounted on the suitcase and locking slide slidably supported in the housing, so that it prestresses the locking slide orienting it towards a position wherein the locking slide blocks the wheel rotatably supported between the free ends of the legs of a U-shaped bearing block rotatably, or swivelably supported in the housing, thus blocking the wheel in a position wherein its direction of rotation is perpendicular to the running direction.

This makes it possible to achieve in a technically simpler manner a wheel support enabling the wheel to be steered freely in all directions, but ensuring that the wheel can be fixed in a position wherein its direction of rotation is perpendicular to the running direction. When the suitcase is lifted or when it is rolled away without being guided by, the handle the wheel positions itself transversely. When the handle or the handlebar is in its rest position, the wheel is locked in this transverse position.

In the locking slide a recess is formed wherein a rotatable curved part can be fixed in a position wherein the direction of rotation of the wheel is perpendicular with respect to the running direction, whereby in the curved piece a vertical segment of an angle lever is fixed. The latter has a further vertical segment which is arranged at a right angle with respect to the vertical segment fixed in the curved part and is also fixed in the bearing block.

The connection between the locking slider and the bearing block is thereby achieved in a simple manner whereby then the curved section can be fixed in the locking slider and is freely rotatable as far as it is not fixed by the locking slider.

BRIEF DESCRIPTION OF THE DRAWING

The above and other objects, features and advantages of the invention will become more readily apparent from the following description, reference being made to the accompanying highly diagrammatic drawing in which.

SPECIFIC DESCRIPTION

Figure 1:
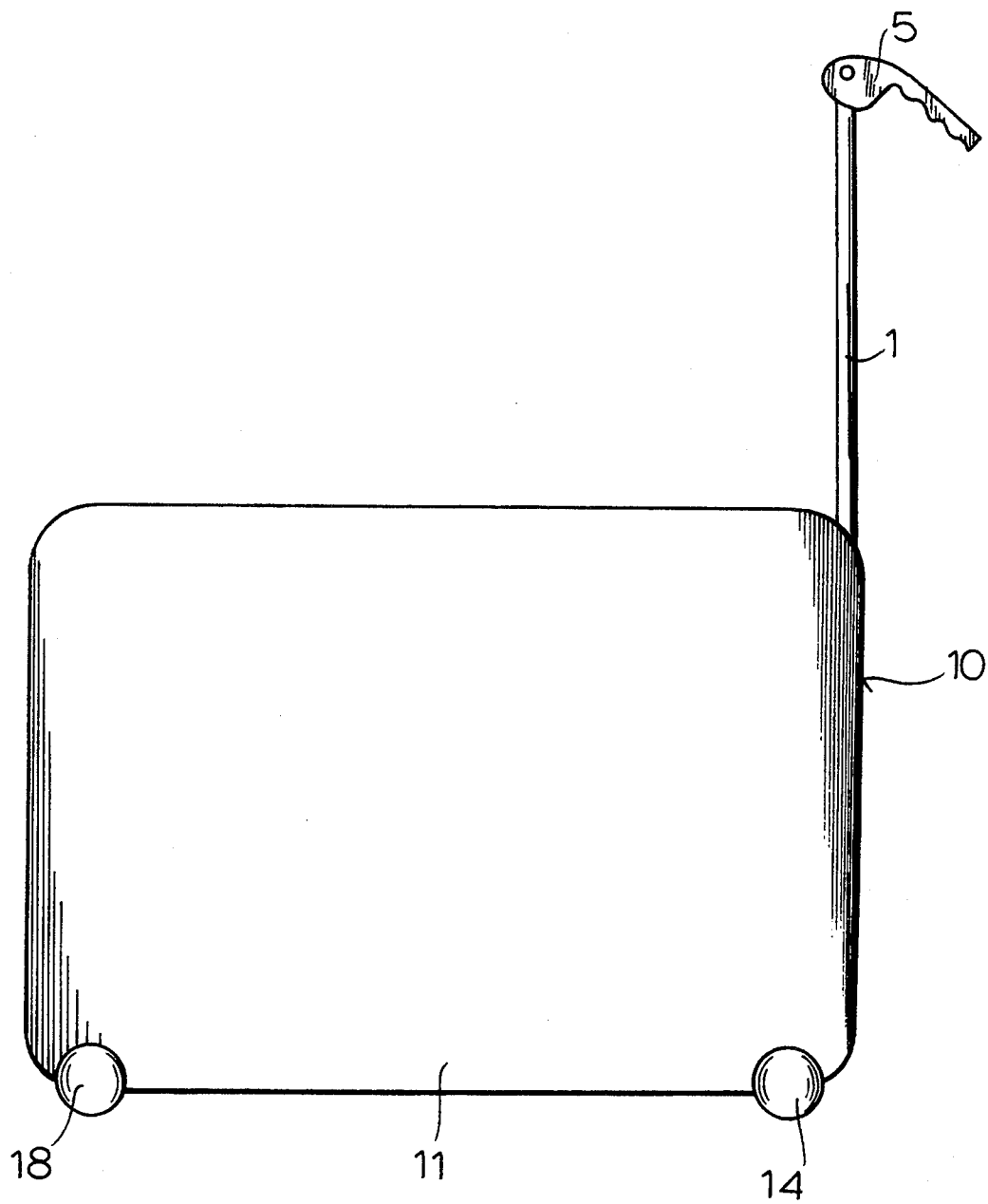
FIG. 1 is a side-elevational view of a rollaway suitcase.
Figure 2:
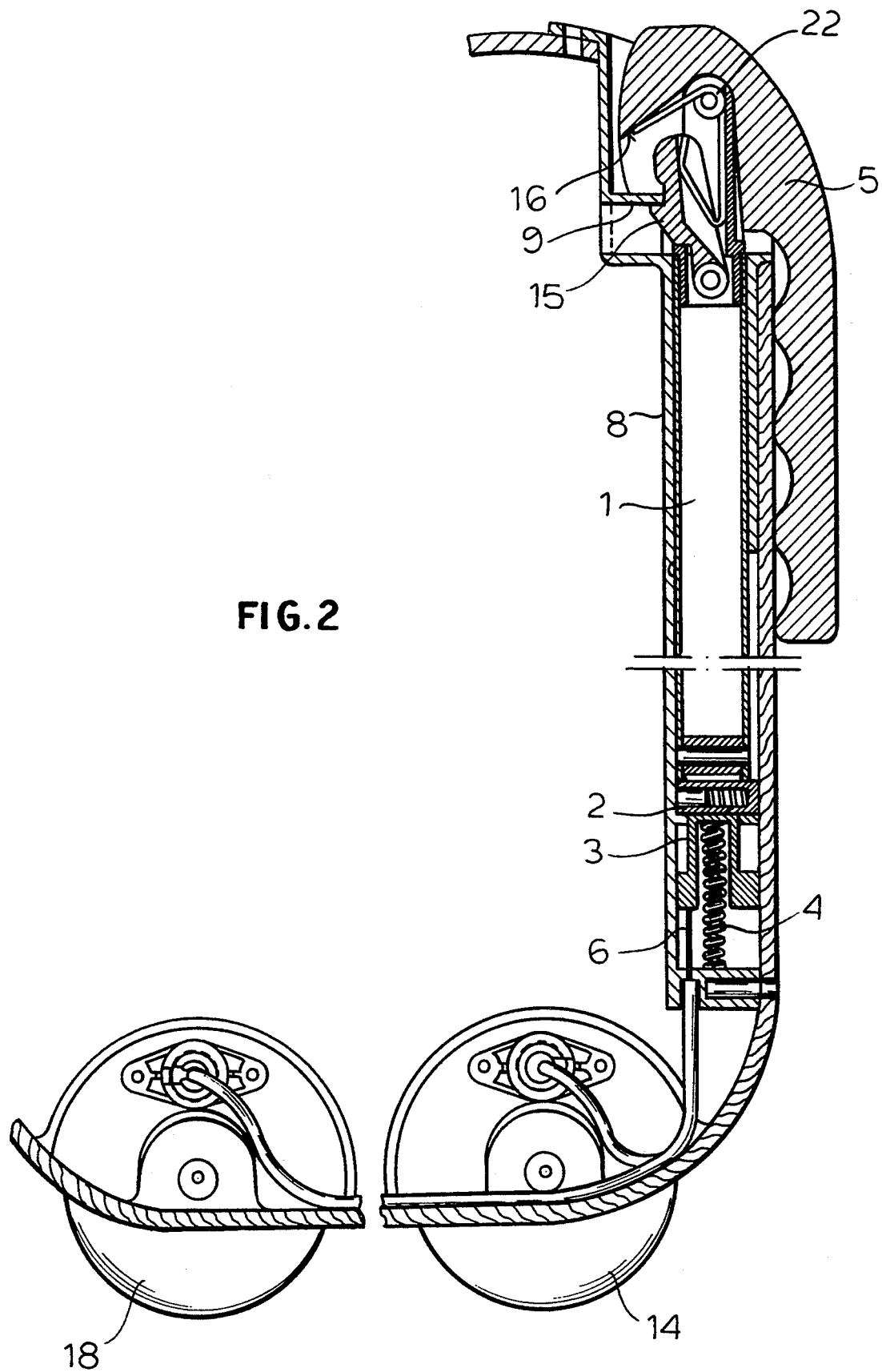
FIG. 2 is a longitudinal section through the essential parts of an embodiment example of the suitcase according to the invention.

A suitcase 11 is equipped with wheels 14 close to its front end and with wheel 18 close to its rear end. On these wheels 14, 18 the suitcase 11 can be rolled away on a surface which is not shown in the drawing. For this purpose, the suitcase 11 is provided in the upper area of its front wall 10 with a handle mechanism, comprising a rod 1 and a handle or manipulator 5. The rod 1 is vertically adjustable between an extended position, wherein it projects from the suitcase in an upward direction, as can be seen in FIG. 1, and a retracted position, wherein it is lodged inside the suitcase 11, as shown in FIG. 2. Close to the upper end of rod 1 a catch 15 is hinged which, when the rod 1 is in its retracted position, engages a locking element 9 provided in the upper part of a holding element 8 receiving the rod 1 and blocks the rod 1 in its retracted position.

At the upper end of rod 1 the handle 5 is swingably hinged. In the retracted position of rod 1, the handle 5 is pressed by means of a torsion spring 22 into a position wherein it stays as close to and as flush as possible with the contour of the suitcase 11.

Another section of the torsion spring 22 presses the catch 15 in its blocking position, wherein it engages the locking element 9. A shoulder 16 is formed in one piece with the handle 5 and by means of this shoulder the catch 15 can be switched from its blocking position to its release position by swivelling the handle 5.

At the other, i.e. lower end of rod 1 when in its retracted position, the rod 1 rests against a slider 3; this is also movable in vertical direction with respect to the suitcase 11. The slider 3 is actuated from its remote side with respect to the rod by a spring mechanism 4 supported in the holding element 8. The slide is thus pressed against the lower end 2 of rod 1.

On the slider 3, at its remote end with respect to the rod, two pull cables 6 and 17 are mounted. The pull cable 6 acts in conjunction with the front wheel 14, the tackle 17 acts in conjunction with the rear wheel 18. Since the components provided between the cable 6 and the wheel 14 correspond to the ones between the tackle 17 and the wheel 18 regarding their configuration, function and effect, subsequently only the components between cable 6 and the front wheel 14 will be described.

At its remote end with respect to the slider, the pull cable 6 is connected with a blocking device 12 shaped like a pin. The pin 12 is slidably arranged in a receiving element 23. Between an inner front wall of the receiving element 23 and the opposite front wall of pin 12, a spring mechanism 7 is provided, which prestresses the pin 12 outwardly from the receiving element in the direction of the front wheel 14 of the suitcase 11. The pin 12 is provided with a projection 25 on its outer front wall.

The front wheel 14 has a recess 13 close to its outer circumference, at its front side facing pin 12. The projection 25 of the pin 12 is pressed in the direction of this recess 13 by the first spring mechanism 7, when the recess 13 and the projection 25 are flush.

The second spring mechanism 4 is designed to be stronger than the first spring mechanism 7, so that the pin 12 can be pressed with its projection 25 into the recess 13 only then when the slider 3 is pushed downwards by the lower end 2 of rod 1, against the force of the second spring mechanism 4.

The interaction of the aforementioned components is described as follows:

In order to roll away the suitcase 11 the handle 5 is swung away from the suitcase 11 and from rod 1, against the force of torsion spring 22. After the handle 5 has been swivelled by a certain angle, the shoulder 16 formed on the handle 5 comes to rest against the catch 15 and releases it—while the swivel motion of handle 5 continues—from its engagement with the locking element 9. After the position of catch 15 has been changed, the rod 1 can be pulled out from the holding element 8, into its extended position shown in FIG. 1. The lower end 2 of rod 1 is drawn away from the slider 3. The latter is pushed upwards by the second spring mechanism 4 against the lesser force of the spring mechanism 7, which acts in the opposite direction at the end of pull cable 6 which is remote with respect to the slider. During this upward motion of the slider 3, the cable 6 is also pulled upwards, so that it removes the pin 12 from the wheel 14. The projection 25 of the pin 12 and the recess 13 provided at the wheel 14 are disengaged; the wheel 14 can now rotate freely. The suitcase 11 is now ready to roll.

In order to reset the handle 5 in its rest position, the rod 1 is moved downwards in its retracted position. The torsion spring 22 resets the handle in the position wherein it rests against the suitcase 11. Due to this swivel motion, the shoulder 16 and the catch 15 are no longer in contact, so that the latter is restored to its blocking position wherein it engages the locking element 9 by the torsion spring 22.

During its downward motion, the rod 1 via its lower end 2 presses the slider 3 downwards, against the force of the second spring mechanism. Thereby, the cable 6 is relaxed. The play generated by this relaxation is immediately converted by the force of the first spring mechanism 7 into a displacement motion of the pin 12 in the direction of wheel 14. As soon as the recess 13 in the turning wheel 14 is level with the projection 25 of pin 12, the first spring mechanism 7 restores the engagement between projection 25 and the recess 13. Thus, the wheel 14 is blocked. An uncontrolled rolling of the suitcase can not take place.

Figure 5:
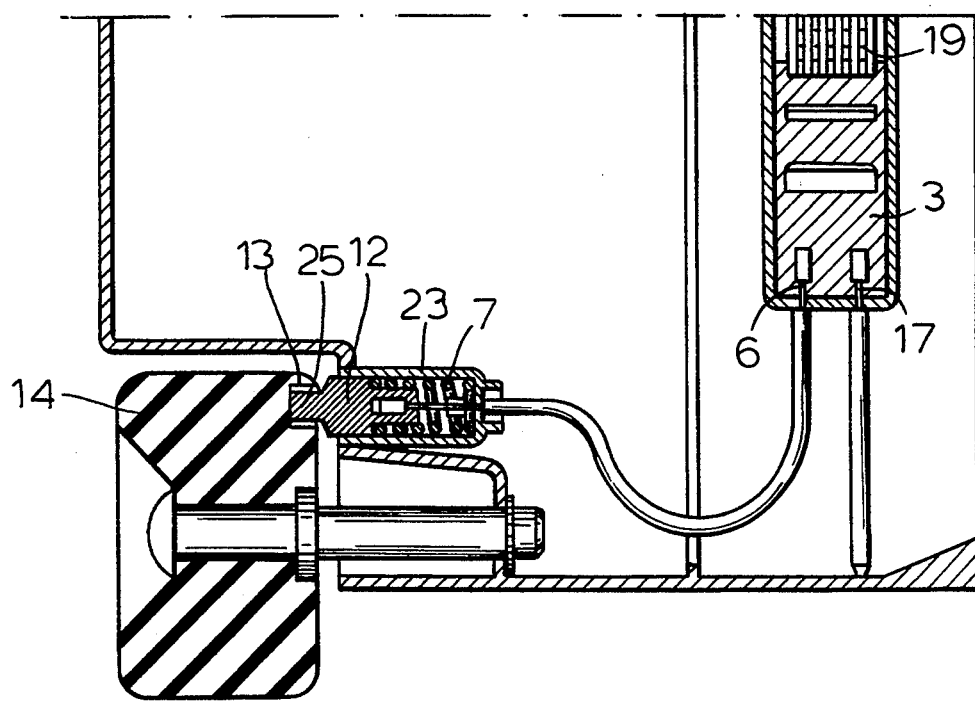
FIG. 5 is a cross section through essential parts of the embodiment example shown in FIG. 4.
Figure 3:
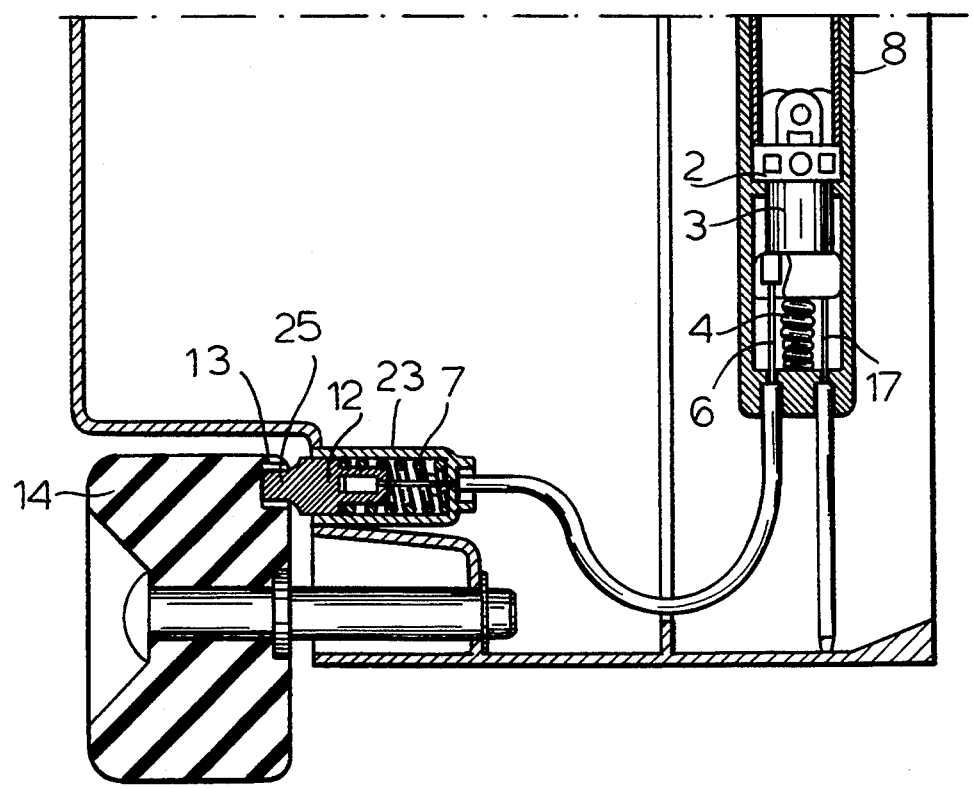
FIG. 3 is a cross section through essential parts of the embodiment shown in FIG. 2.
Figure 4:
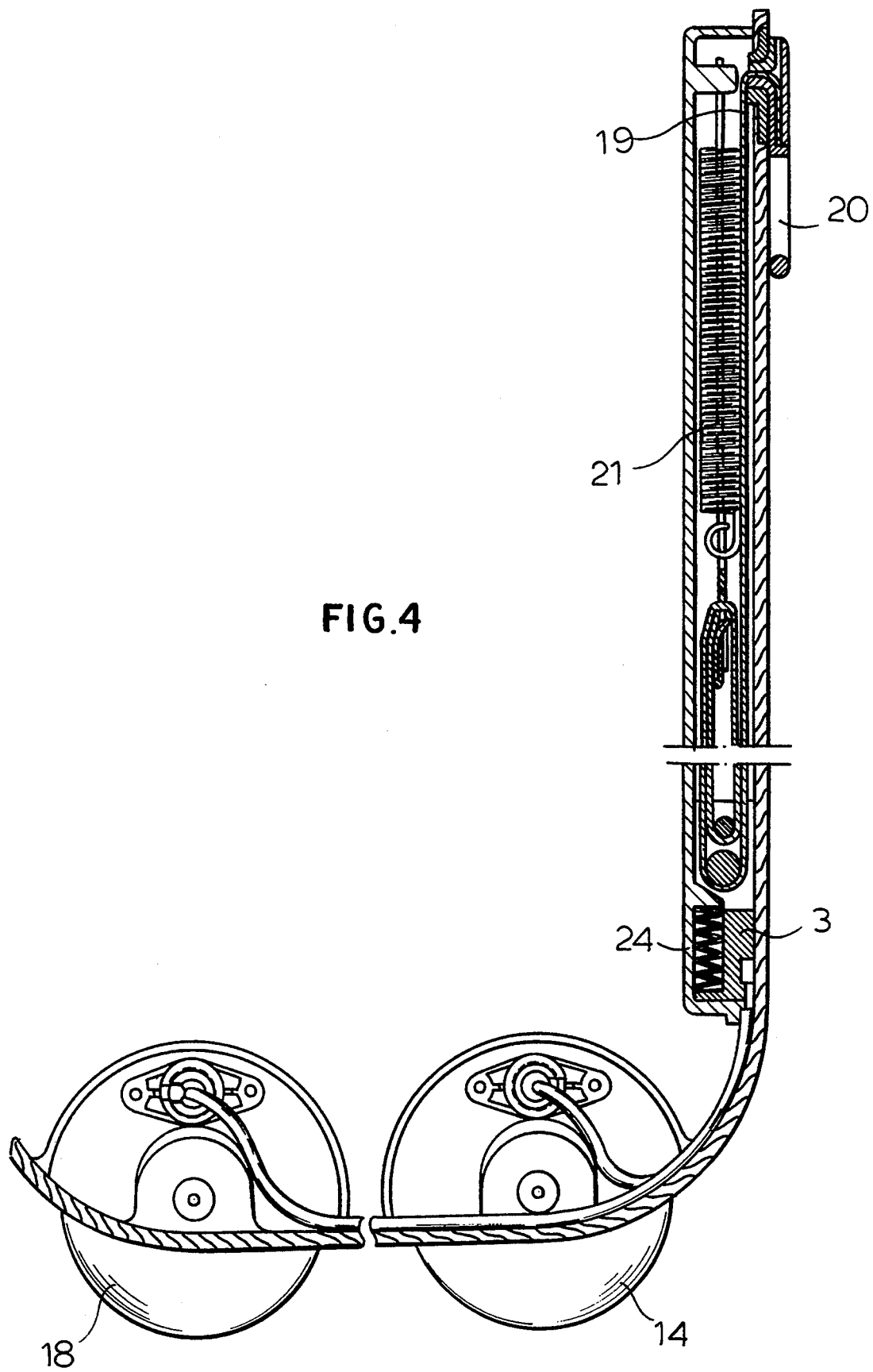
FIG. 4 is a longitudinal section through essential parts of a further embodiment of the suitcase according to the invention.

The differences between the first above-described embodiment example and the second embodiment example illustrated in FIGS. 4 and 5 are as follows:

A second spring mechanism 24 urges the slider 3 downwards into a position wherein the components provided between the slider 3 and the wheel 14, which correspond to the ones in the first embodiment example, cause a blocking of wheel 14.

The slider 3 is connected with a belt strap 19, which is prestressed by a spring 21. When the belt strap 19 is pulled out of the suitcase 11 by pulling the handle piece 20 connected thereto, during the last segment of this motion it displaces the slider 3 upwards against the force of the second spring mechanism 24. Due to this upward motion of the slider 3—as described with regard to the first embodiment example—the pin 12 is pulled via cable 6 into a position wherein it releases the wheel 14.

When the belt strap 19 is released and is again retracted in the suitcase, the second spring mechanism 24 presses the slider 3—which is no longer under the action of belt strap 19—downwardly, with the result that the engagement between pin 12 and wheel 14 is restored, as described with regard to the first embodiment example.

Figure 6A:
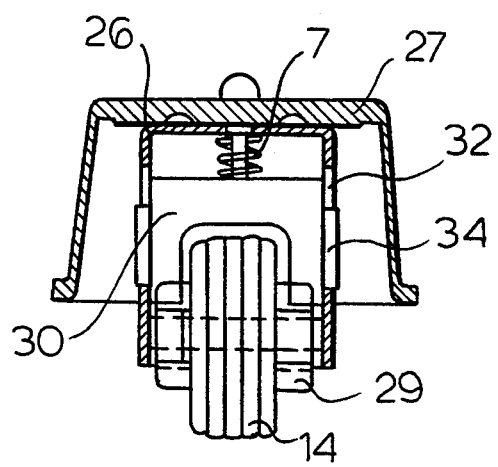
FIGS. 6a to 6c show various illustrations of a second embodiment of the wheel-side components of a blocking mechanism.
Figure 6B:
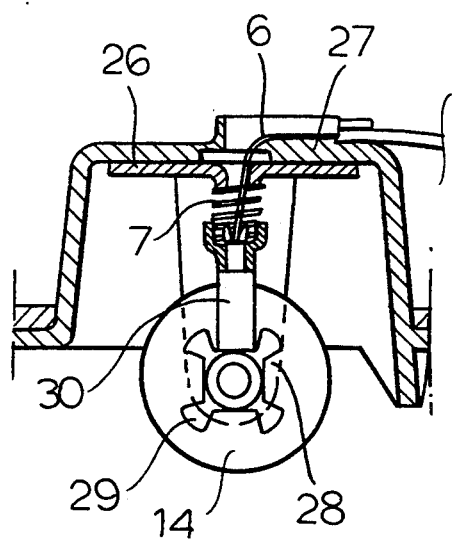
Figure 6C:
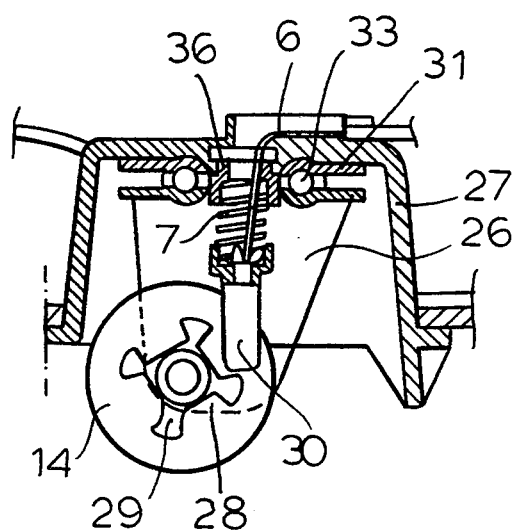

In FIGS. 6a–6c a second embodiment of the components of the blocking means on the wheel side are shown, which are connected to the slider 3 via cable 6 shown in FIGS. 6b and 6c. On the wheel-side end of cable 6 a locking part 30 is mounted. This locking part 30 is provided with projections 34 on its lateral front walls, which engage in slots 32 formed in a U-shaped bearing block 26 and longitudinally slidable therein. The first spring mechanism 7 is arranged between the bearing block 26 and the locking part 30 so that it prestresses the locking part 30 downwardly, causing it to engage in recesses 28 which are provided in flanges 29, which are designed, respectively provided on both sides of wheel 14. The locking part 30 is provided with a median depression 35, wherein the segment of the wheel 14 which protrudes above the bottom of recesses 28 can be received. The locking part 30 is always blockingly engaging the recesses 28 when the handle, respectively handlebar 5 of suitcase 11 is in its rest position. When the handle, respectively the handlebar 5 is set in its operating position, the tackle 6 is pulled away from the wheel 14 by the spring mechanism 4, so that the locking part 30 lifts against the force of the first spring mechanism 7 as far as necessary for interrupting the blocking contact between the locking part 30 and the recesses 28, so that the wheel 14 can turn. The wheel is rotatably received at the free ends of the legs of the U-shaped bearing block 26, which in turn is partially received or countersunk in a downwardly opening housing 27 fastened to the suitcase 11 which is not shown.

As shown in FIG. 6b, the bearing block 26 can be stationarily mounted in the housing 27, it is also possible to mount the bearing block 26 swingably in the housing 27, for the purpose of a possible change of direction of wheel 14, whereby then a ball bearing 33 is provided between the base of the U-shaped bearing block 26 and a bearing part 31 mounted on the housing 27 and the bearing block 26 is rotatable around a hub part 36 mounted on housing 27, the inside of this part being designed to hold the upper end of the first spring mechanism 7.

Figure 7A:
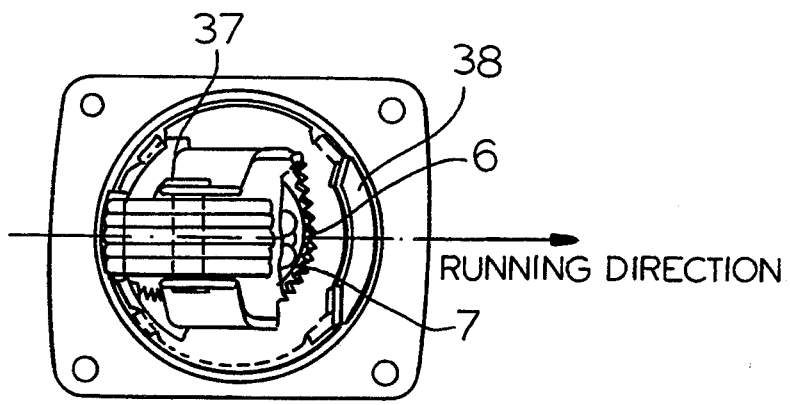
FIGS. 7a to 7d are various illustrations of a third embodiment of the wheel-side components of the blocking mechanism.
Figure 7B:
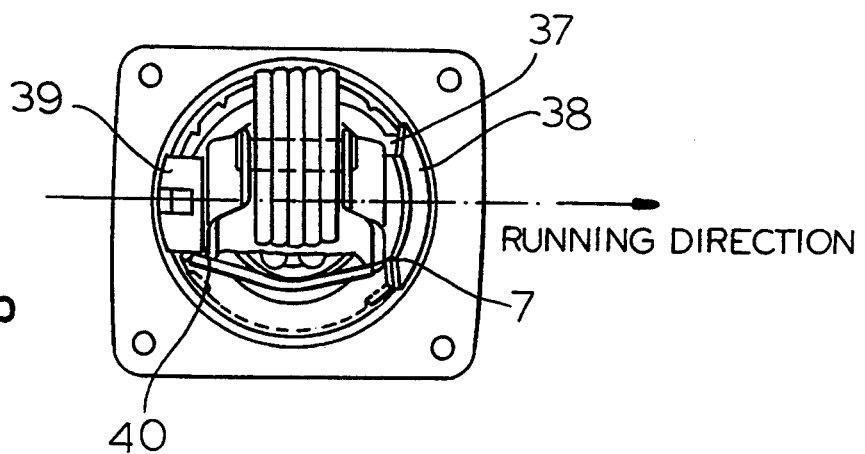
Figure 7C:
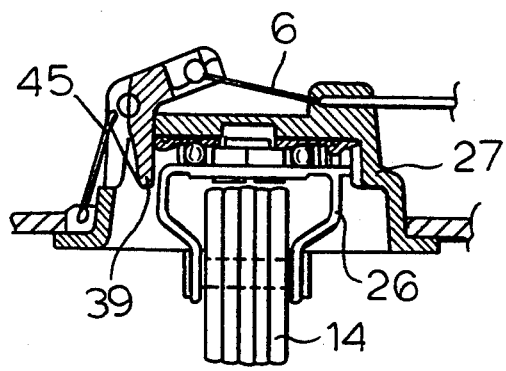
Figure 7D:
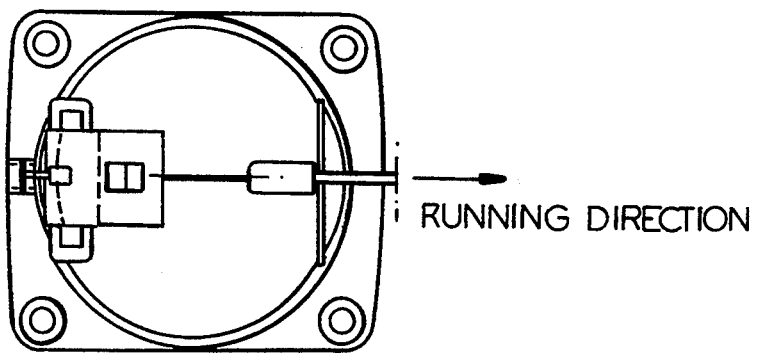
Figure 8A:
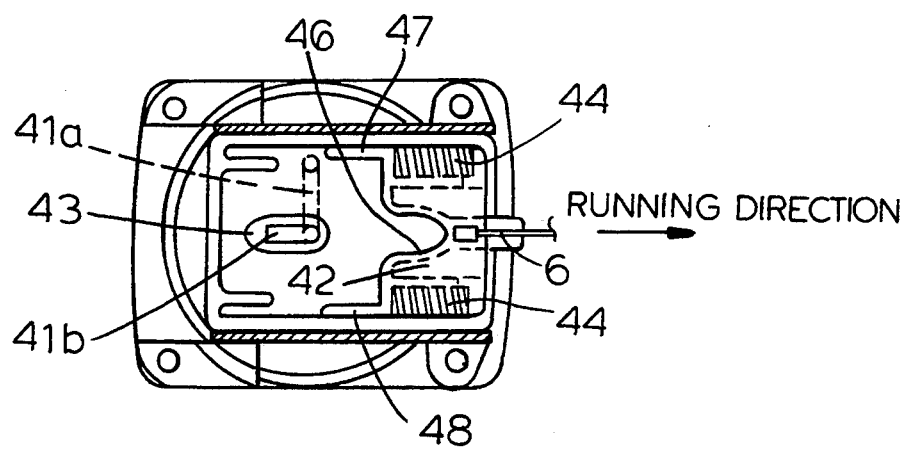
FIGS. 8a to 8d are various illustrations of a third embodiment of the wheel-side components of a blocking mechanism.
Figure 8B:
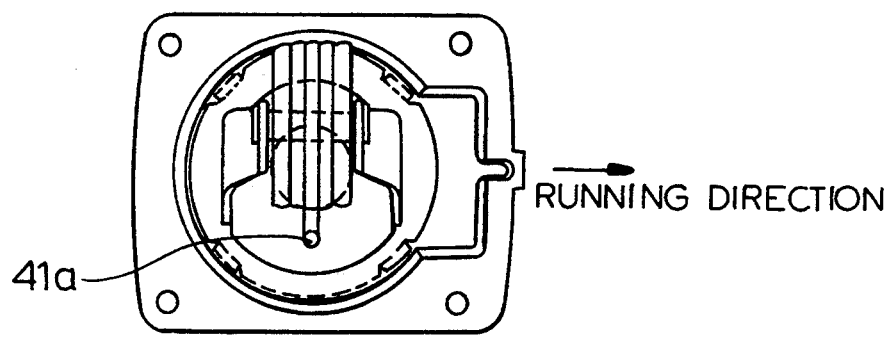
Figure 8C:
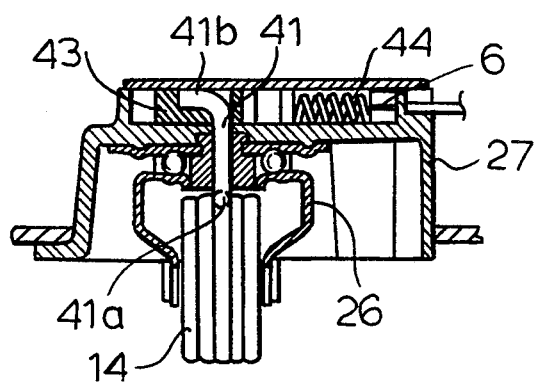
Figure 8D:
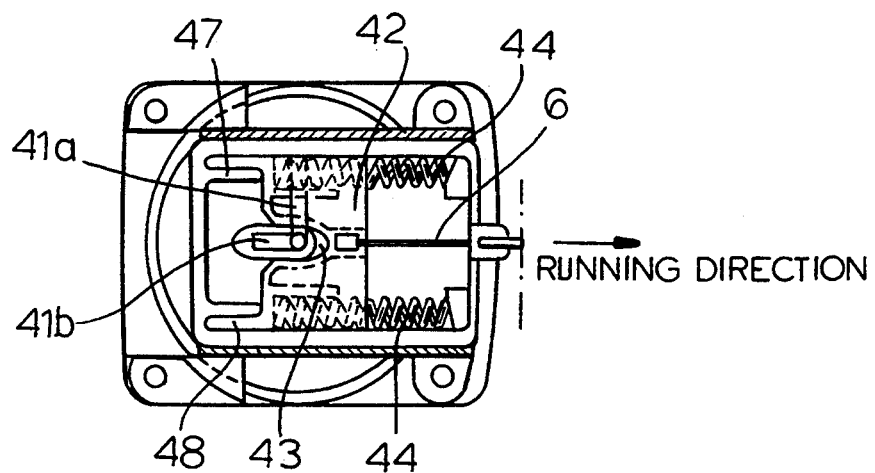

In the embodiment shown in FIGS. 7a to 7d, the wheel-side or roller-side component of the blocking means is also the approximately U-shaped bearing block 26, rotatably, respectively swivellably received in the housing 27. The first spring mechanism 7 is a coil spring fastened with one end on the bearing block 26 and with the other end on the housing 27, so that it prestresses the bearing block 26, respectively the wheel 14 in a position which is perpendicular to the running direction, as shown in FIG. 7b. In this position an arresting edge 37 formed on the bearing block 26 knocks against an arresting edge 38 formed on housing 27, so that a further rotation of the bearing block 26 in the housing 27 is prevented. In this position of the bearing block 26 a recess 40 formed in bearing block 26 is arranged so that an angle lever 39, swingably hinged to the housing 27 and prestressed by a spring 45 in the direction of its engagement with the recess 40, is engaged. When the engagement between the angle lever 39 and the recess 40 is established, the wheel 14, respectively the U-shaped bearing block 26 is blocked in the position shown In FIGS. 7b and 7c, wherein the wheel 14 is arranged perpendicularly to the running direction. As far as the handle or respectively handlebar 5 is set in its operational position, by pulling the cable 6 which takes place by means of the second spring mechanism 4, the angle lever 39, to which the wheel side end of the cable 6 is fastened, swings away from bearing block 26 against the force of spring 45, so that it no longer engages in recess 40 provided on the bearing block 26. The wheel 14 is no longer blocked in the perpendicular position with respect to the running direction. Against the force of the first spring mechanism 7, the bearing block 26 and the wheel 14 can now assume a position parallel to the running direction during the rolling of suitcase 11. When the suitcase 11 is lifted or after a short travel without the guidance coming from handle, or handlebar 5, the wheel 14 assumes a transverse position under the action of the first spring mechanism 7. When the handle or handlebar 5 is retracted, the cable 6 is relieved, the angle lever 39 swings into the recess 40. After that the bearing block 26 or the wheel 14 is locked in a transverse or blocking position.

In FIGS. 8a to 8d, a fourth embodiment of the wheel side components of the blocking means is illustrated. The cable 6, which just like in the previously described embodiments is connected with the slide 3 not shown here, is fastened at its wheel side end to a locking slide 42. The locking slide 42 is prestressed by two springs 44 constituting the first spring mechanism so that a curved part 43 is received in a recess 46 formed on the locking slide 42 and shaped so that it accommodates and locks the curved part 43. The perpendicular segment 41b of an angle lever 41 is rigidly mounted in the curved part 43. At its other end, the angle lever 41 is shaped with a further vertical segment 41a, which extends at a right angle to the curved-part side of the segment 41b and is fastened to the bearing block 26 which is rotatably or swivellably supported in the housing 27. When the curved part 43 is caught and fixed in the recess 46 of locking slide 42, which always happens when the springs 44 can move the locking slide 42 towards the curved part 43, the segment 41b of the angle lever 41 fixed in the curved part 43 is arranged in running direction. Then the segment 41a of angle lever 41 fixed in the bearing block 26 and the wheel 14 are arranged perpendicularly to the running direction, since the segment 41a extends parallelly to the rotation direction of wheel 14. The wheel 14 is blocked correspondingly perpendicular to the running direction and can not be turned in the running direction.

In order to insure that the curved piece 43 is received in recesses 46 of the locking slide 42 during the motion of the latter toward the curved piece 43 under the action of springs 44, the recess 46 has a comparatively large opening surface and the locking slide 42 is provided with two projections 47, 48, which point away from springs 44 and which during a sliding motion of the locking slide 42 towards the curved piece 43, if required, push against the eccentrically arranged end of the curved piece 43 and force it into a position where it can be received by recess 46.

When the handle or handlebar 5 is moved from the rest position into the operating position and the slider 3 is displaced by the second spring mechanism 4 and thereby the cable 6 is pulled away from wheel 14, the locking slide 42 is pushed against the force of springs 44 which is smaller than the force of the second spring mechanism 4 and is removed from the curved part 43, until the curved part 43 is released from the recess 46 of the locking slide 42. When the suitcase 11 is moved in the running direction, the wheel 14 can now swing freely, so that its rotation direction is now arranged in the running direction of suitcase 11. When the suitcase 11 is lifted or when the suitcase 11 rolls without guidance at the handle or handlebar 5, the wheel 14 sets itself in a transverse position under the action of springs 44 and remains in this transverse position when locked in the rest position by the retraction of the handle or handlebar 5, since then the curved part 43 is caught and locked in the recess 46 of the locking slide 42.

We claim:

1. An article of luggage, comprising:
   a traveling case having a bottom;
   at least three rollers on said bottom enabling rolling of said case upon a surface upon free rotation of said rollers;
   rotation-blocking means at at least one of said rollers engageable to prevent rotation of said one of said rollers and thereby prevent rolling of said case upon said surface;
   first spring means for biasing said rotation-blocking means in a direction to engage said rotation-blocking means;
   means defining a movable handle on said case upon gripping by a user to draw said case over said surface;
   coupling means operatively connected to said rotation-blocking means and to said handle means stressing said first spring means upon gripping of said handle means by said user and for disengaging said rotation-blocking means to enable rotation of said one of said rollers; and
   second spring means acting upon said coupling means and via said coupling means upon said rotation-blocking means for urging said rotation-blocking means out of engagement, said second spring means being prestressed at a greater force than said first spring means.

2. The article of luggage defined in claim 1 wherein said rotation-blocking means includes a pin engageable in said one of said rollers.

3. The article of luggage defined in claim 2 wherein said one of said rollers has a recess, said pin being slidable into said recess.

4. The article of luggage defined in claim 1 wherein said coupling means includes:
   a rod displaceable vertically on said case between retracted and extended positions, said rod having one end operatively connected with said handle means for simultaneous vertical movement of said handle means and said rod, said handle means being displaceable between inactive and active positions corresponding respectively to said retracted and extended positions of said rod,
   a slider on the other end of said rod following movement of said handle means, and
   cable means connecting said slider with said rotation-blocking means and movable with said slider upon displacement of said handle means
   from said inactive position into said active position for disengaging said rotation-blocking means and
   from said active position into said inactive position for engaging said said first spring means with said rotation-blocking means.

5. The article of luggage defined in claim 4 wherein said handle means is hinged on said one end of said rod.

6. The article of luggage defined in claim 5, further comprising catch means for retaining said rod in said retracted position and said handle means in said inactive position until said handle means is gripped by said user.

7. The article of luggage defined in claim 6 wherein said handle means is formed unitarily with a shoulder and is movable angularly, said shoulder engaging said catch means in a locking position thereof corresponding to said retracted position of said rod and resetting said catch means into a release position upon angular displacement of said handle means.

8. The article of luggage defined in claim 4 wherein said slider is biased against said rod by said second spring means.

9. The article of luggage defined in claim 4, further comprising a belt connected with said slider and with said handle means and adapted to be drawn out of said case upon pulling the handle means into said active positive thereof, said belt displacing said slider against a force of said second spring means to release said rotation-blocking means.

10. The article of luggage defined in claim 1 wherein said rotation-blocking means is positioned to block at least two of said rollers forming blockable rollers.

11. The article of luggage defined in claim 10 wherein one of said blockable rollers is arranged close to a front end of said case and another of said blockable rollers is arranged close to a rear end of said case.

12. The article of luggage defined in claim 1, further comprising a U-shaped bearing block in which said one of said rollers is journaled, said bearing block rotatably supporting said one of said rollers between free ends of legs of the bearing block.

13. The article of luggage defined in claim 12 wherein said rotation-blocking means includes a locking means between said legs engageable with said one of said rollers, said locking means having projections guided in said rollers.

14. The article of luggage defined in claim 12 wherein said locking means is positioned to engage in recess formed in at least one lateral flange of said one of said rollers.

15. The article of luggage defined in claim 12, further comprising means for mounting said bearing block swivelably on said bottom of said case.

16. The article of luggage defined in claim 12 wherein said first spring means is arranged between a downwardly open housing mounted on said case and said bearing block.

17. The article of luggage defined in claim 16 wherein said bearing block is formed with an arresting edge which abuts an arresting edge on said housing when said roller has a direction of rotation perpendicular to a running direction of the case.

18. The article of luggage defined in claim 16, wherein said rotation blocking means further comprising an angle lever actuatable to retain said bearing block in an orientation of said one of said rollers so that a direction of rotation thereof is perpendicular to a running direction of the case.

19. The article of luggage defined in claim 1 wherein said first spring means is arranged between a downwardly open housing on said case and said rotation-blocking means, said rotation blocking means including a locking slide received in said housing and operatively connected with said one of said rollers, said first spring means prestressing said locking slide to block said one of said rollers, said one of said rollers being a wheel supported between legs of a bearing block, said bearing block including means for supporting swivelably in said housing.

20. The article of luggage defined in claim 19 wherein said rotation-blocking means further includes a lever having a vertical arm and a horizontal arm at a right angle to said vertical arm and engaging in said locking slide.

21. The article of luggage defined in claim 19 wherein said first spring means comprises two springs.

* * * * *